United States Patent [19]
Johnston

[11] Patent Number: 5,600,820
[45] Date of Patent: Feb. 4, 1997

[54] METHOD FOR PARTITIONING MEMORY IN A HIGH SPEED NETWORK BASED ON THE TYPE OF SERVICE

[75] Inventor: Cesar A. Johnston, Morristown, N.J.

[73] Assignee: Bell Communications Research, Inc., Morristown, N.J.

[21] Appl. No.: 160,525

[22] Filed: Dec. 1, 1993

[51] Int. Cl.⁶ .............................. G06F 12/02; H04J 3/24
[52] U.S. Cl. .................. 395/497.02; 395/497.04; 395/412; 370/412; 370/395
[58] Field of Search ................................ 395/425, 400, 395/497.02, 497.04, 497.01; 370/60.1, 60, 94.1; 394/412

[56] References Cited

U.S. PATENT DOCUMENTS

| | | | |
|---|---|---|---|
| 5,130,984 | 7/1992 | Cisneros | 370/94.1 |
| 5,241,536 | 8/1993 | Grimble et al. | 370/60.1 |
| 5,274,768 | 12/1993 | Traw et al. | 395/200.2 |
| 5,303,302 | 4/1994 | Burrows | 370/60 |
| 5,309,432 | 5/1994 | Kanakia | 370/60 |
| 5,359,592 | 10/1994 | Corbalis et al. | 370/94.1 |
| 5,367,643 | 11/1994 | Chang et al. | 395/309 |
| 5,379,297 | 1/1995 | Glover et al. | 370/60.1 |
| 5,383,146 | 1/1995 | Threewitt | 395/431 |
| 5,432,908 | 7/1995 | Heddes et al. | 395/497.01 |
| 5,452,330 | 9/1995 | Goldstein | 375/257 |

*Primary Examiner*—Eddie P. Chan
*Assistant Examiner*—Reginald G. Bragdon
*Attorney, Agent, or Firm*—Joseph Giordano; James W. Falk

[57] ABSTRACT

A method and system are provided for managing memory to reassemble data packets received from different virtual channels in an ATM network. The method and system recognizes that both reliable and best effort traffic must be supported by a network interface. The system makes use of a virtual First-In-First-Out (FIFO) concept that partitions RAM memory space into multiple FIFO queues. The virtual FIFOs can have different sizes, and can be allocated to connections depending on quality of service requirements. A dedicated embedded controller 721 to provide flexibility is used in the system, as well as Content Addressable Memory (CAM) devices 723,724, and external logic. The method and system can also be applied at ATM transmitters in the implementation of congestion control algorithms.

1 Claim, 5 Drawing Sheets

FIG. 6A
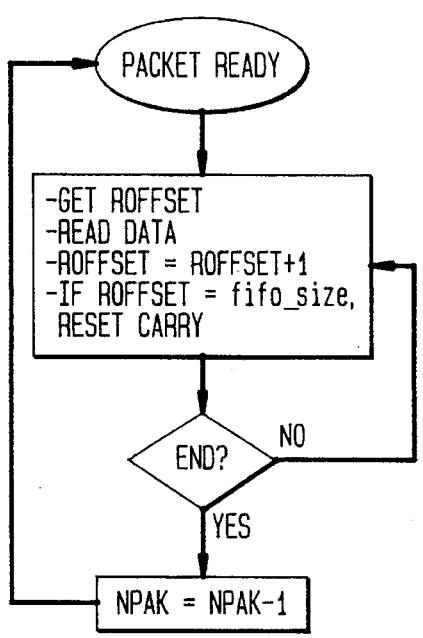
FIG. 6B
| VCI | WPSTART | CARRY | WOFFSET | ROFFSET | NPAK |
|-----|---------|-------|---------|---------|------|
| ⋮ | ⋮ | ⋮ | ⋮ | ⋮ | ⋮ |
FIG. 7
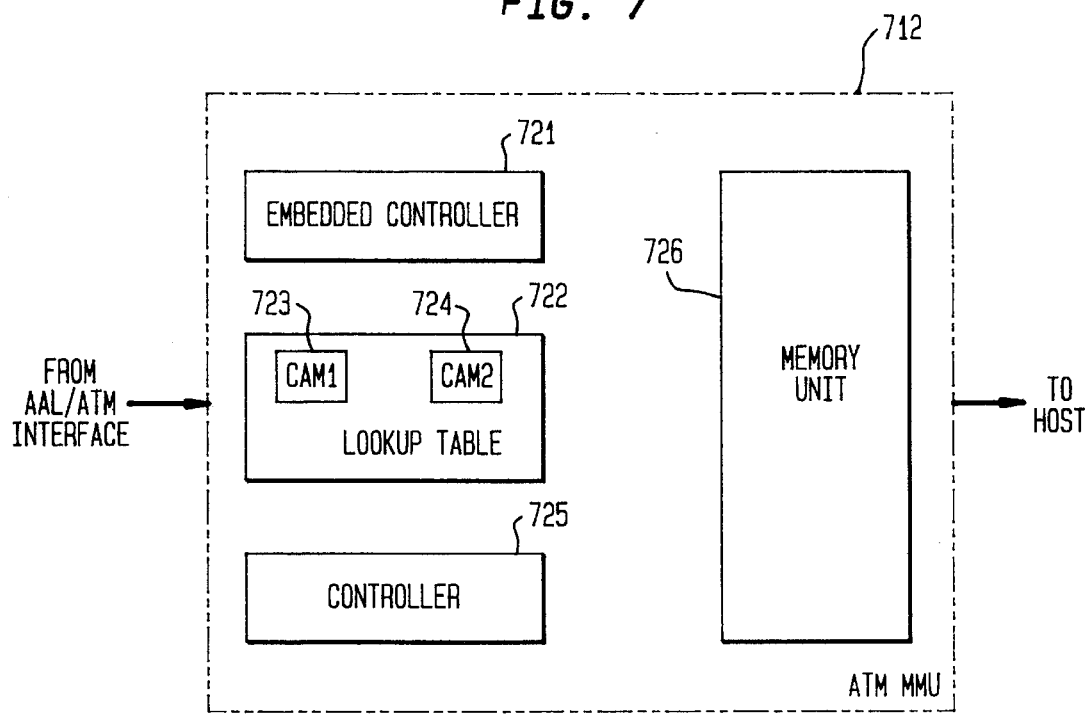

FIG. 8A

| ASSOCIATIVE AREA 828 | | RAM AREA 827 | | 723 |
|---|---|---|---|---|
| VCI | Lp0 | PHp0 | A | E |
| VCI | Lp1 | PHp1 | A | E |
| ... | ... | ... | ... | ... |
| VCI | Lpn | PHpn | A | E |

VCI - VIRTUAL CIRCUIT IDENTIFIER
Lp - LOGICAL PAGE
PHp - PHYSICAL PAGE
A - AGING BIT
E - EXTENDED BIT

FIG. 8B

| 828 |
|---|
| p0 |
| p1 |
| ... |
| pn |

FIG. 8C

| ASSOCIATIVE AREA 829 | | | RAM AREA 830 | | | 724 |
|---|---|---|---|---|---|---|
| VCI | LPPV | OFFSET | B | MAXSIZE | E | NPAK |
| VCI | LPPV | OFFSET | B | MAXSIZE | E | NPAK |
| ... | ... | ... | ... | ... | ... | ... |
| VCI | LPPV | OFFSET | B | MAXSIZE | E | NPAK |

LPPV - LOGICAL PAGE POINTER VALUE
OFFSET - PAGE OFFSET
B - BEGINNING BIT
MAXSIZE - MAXIMUM PACKET SIZE
NPAK - NUMBER OF REASSEMBLED PACKETS
E - EXTENDED BIT

METHOD FOR PARTITIONING MEMORY IN A HIGH SPEED NETWORK BASED ON THE TYPE OF SERVICE

This invention was made with Government support under Contract MDA904-92-C-5197 awarded by the Department of Defense. The Government has certain rights in invention.

CROSS-REFERENCE TO RELATED APPLICATIONS

This application is related to H. H. J. Chao—D. E. Smith U.S. patent application Ser. No 08/010,134, filed Jan. 28, 1993 entitled "Method and Adaptor for Converting Data Packets Between First and Second Formats in a Data Transmission System", assigned to the assignee of the present application, and now abandoned. This application is also related to C. A. Johnston—D. E. Smith—K. C. Young, Jr. U.S. patent application Ser. No. 08/160,526, filed on the same day as the present application, entitled "Broadband ISDN Processing Method and System", which is also assigned to the assignee of the present application, and which issued May 9. 1995, as U.S. Pat. No. 5,414,707.

TECHNICAL FIELD

This invention relates to methods and systems for managing memory in a high speed network and, in particular, to method and system for managing memory in a high speed network to reassemble data packets received from different virtual channels.

BACKGROUND ART

Asynchronous Transfer Mode (ATM) networks provide integrated services having a wide range of bandwidths and holding times. ATM traffic can be subdivided into Constant Bit Rate (CBR) and Variable Bit Rate (VBR) traffic types. Each traffic type is supported by one or more ATM Adaptation Layers (AAL). AAL type 3, 4 or 5 protocols are employed for data packets or VBR traffic while AAL type 1 is used for CBR traffic.

The transport of packets across the network is accomplished by segmenting the data unit into cells, which are then transmitted to a destination. At the destination, reassembly of the packet is required before passing it to a receiving application. To accomplish the reassembly procedure, a memory addressing and management scheme is needed. For example, in a point-to-point transmission scenario, if consecutive cells belong to the same packet, reassembly can be achieved by storing cell payloads belonging to a packet in a memory space in a First In First Out (FIFO) manner. However, if packets are received from different virtual channels, having been multiplexed and switched through the network, cell interleaving occurs, and each virtual channel will require its own FIFO.

FIG. 1 illustrates cell interleaving in an ATM network. Stations A and B transmit information packets, which are carried in the network in the form of ATM cells marked A1, A2, A3 and B1, B2, B3, respectively. When these cells are transmitted through the network, they may be interleaved as shown. At the receive end, the packets must be reconstructed before being passed to applications running on Station C. As a result, reassembly typically requires two FIFOs (FIFO1 and FIFO2) each dedicated to a given virtual channel.

Different approaches have been attempted to solve the reassembly problem of interleaved cells. One solution is to realize that packets are generated and received by host computers, and therefore it is possible to share the host's physical memory space. Thus, one can use the host's operating system to manage the incoming packet information. This solution requires that the applications running on a given platform share the host's physical memory space with the network. As a result, depending on the network load, applications running on a given platform may experience performance degradation or if applications have priority over the network interface, the incoming data packets could be lost.

Another solution is to implement the reassembly function with dedicated hardware. This means reassembling packets in an external memory unit, which transfers packets to a host computer whenever a packet is successfully reconstructed. In the application noted above entitled "Method and Adaptor for Converting Data Packets Between First And Second Formats In A Data Transmission System", a hardware architecture uses linked lists to reconstruct incoming packets. A virtual channel queue holds partial data packets in a shared memory device. In one embodiment, the partial data packets destined for a common virtual channel are associated with a linked list data structure. In an alternate embodiment, a plurality of FIFO devices are used to store the addresses of successive partial packets.

Others have presented another technique by using the host's CPU cycles to control the linked list.

The above solutions are based on the assumption that best effort traffic transmission is required. This is an acceptable assumption since most of today's computer networks work under this constraint. In other words, these techniques might cause cell loss at the reassembly unit due to the nonavailability of memory space at high network throughputs. However, as new applications emerge with strict performance requirements (such as, for example, applications requiring distributed software processing, where the network transmission delay must be kept to a minimum for best performance results), a reliable transport mode must be supported. Furthermore, if multimedia stations are connected to the network, a need to handle AAL type 1 could arise, and a memory management architecture should be able to accommodate this traffic class.

SUMMARY OF THE INVENTION

One object of the present invention is to provide a method and system that substantially simplifies the implementation of the packet reassembly procedure by using computer memory addressing and management techniques, such as segmentation and paging. The method and system utilize virtual FIFOs to allow the partitioning of Random Access Memory (RAM) into FIFO spaces, which can be dynamically sized and allocated to ATM connections. The system preferably uses dedicated hardware, such as Content Addressable Memories (CAM), to speed up search algorithms and uses an embedded controller to provide flexibility.

In carrying out the above object and other objects of the present invention, a method is provided for managing memory to reassemble data packets received from different virtual channels in a high speed network. The method includes the steps of dynamically partitioning a physical memory space into virtual FIFO queues, receiving a quality-of-service signal and dynamically allocating the virtual FIFO queues to high speed connections based on the quality-of-service signal.

A system is also provided for carrying out each of the above method steps.

The above objects and other objects, features, and advantages of the present invention are readily apparent from the following detailed description of the best mode for carrying out the invention when taken in connection with the accompanying drawings.

BRIEF DESCRIPTION OF THE DRAWINGS

FIG. 6a is a block diagram flowchart illustrating virtual FIFO reading;

FIG. 6b is a diagram illustrating a virtual FIFO simplified control table;

FIG. 7 is a block diagram illustrating ATM Memory Management Unit (MMU) architecture of the present invention;

FIGS. 8a, 8b and 8c are diagrams illustrating the partitioning of memory components with FIG. 8a illustrating a CAM1 partition, FIG. 8b illustrating a memory unit partition, and FIG. 8c illustrating a CAM2 partition.

BEST MODE FOR CARRYING OUT THE INVENTION

Memory Addressing and Management Techniques

In general, the memory management problem is a subset of the more general problem in which a limited resource must be shared by different applications. In the present problem, ATM connections are to share a limited physical memory space.

For purposes of this application, a logical address refers to the address referenced by an application, while a physical address refers to a real memory address. In early computer architectures, these two addresses were identical, but recent computer architectures make use of address conversion mechanisms to map them. The mapping is done to make applications transparent to the amount of real memory in the computer. As an analogy, in the present application, a logical address space region for a packet is given by the cell arrival sequence. Indeed, incoming ATM cells arrive in order, and misordering should not occur in the network. On the other hand, a physical address corresponds to memory regions where the cells will be actually stored.

Figure 1:
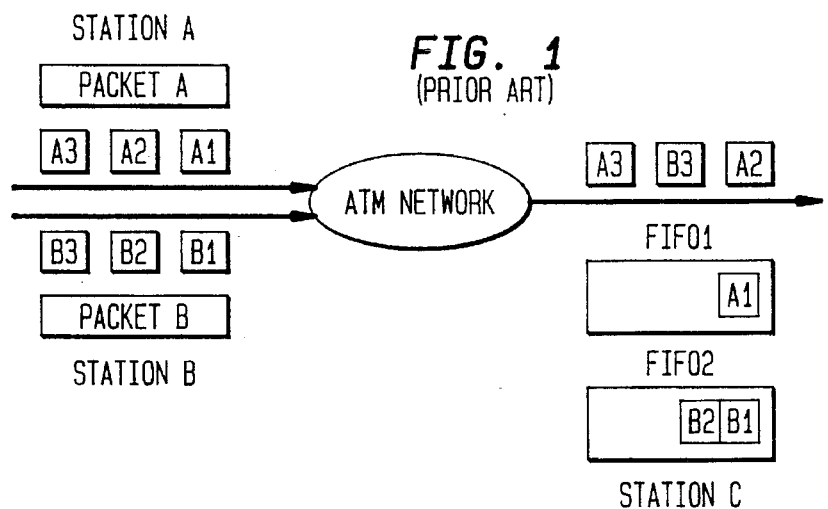
FIG. 1 is a schematic diagram illustrating cell interleaving in an ATM network, as is known in the prior art.
Figure 2:
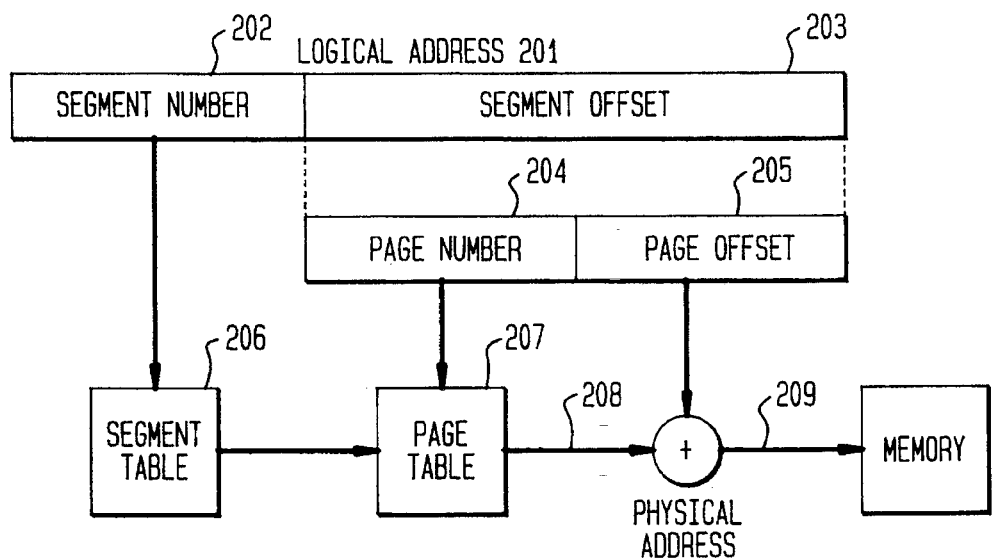
FIG. 2 is a schematic diagram illustrating how segmentation with paging of the present invention works in a logical address structure.

Also, for purposes of this application, memory segmentation refers to the partitioning of a given logical address space into variable size blocks of logical contiguous locations. Paging refers to the partitioning of contiguous logical addresses into small equal size blocks. Combining these two concepts reduces memory fragmentation. FIG. 2 shows how segmentation with paging works. A logical address 201 is composed of a segment number 202 and a segment offset 203. The segment offset 203 is a combination of a page number 204 and a page offset 205. The segment number 202 points to a segment table 206, which in turn points to a page table 207, where a page address is obtained on line 208, and combined with the page offset 205 to form the physical address on line 209.

ATM Memory Management Unit

Figure 3:
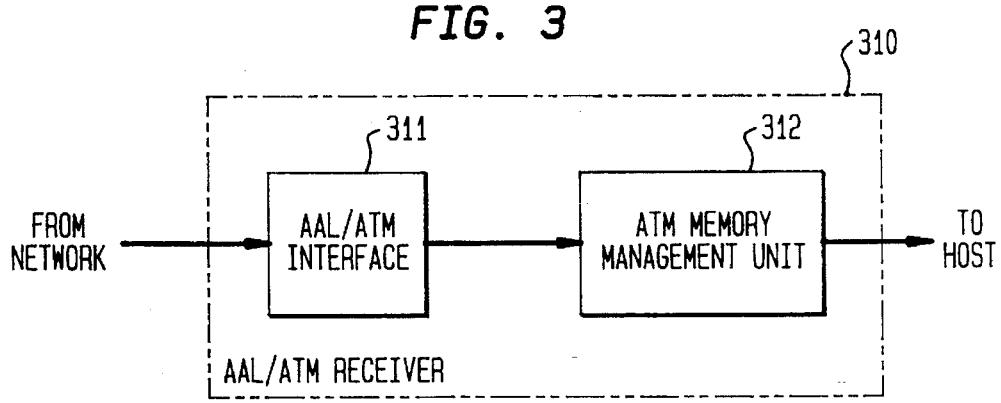
FIG. 3 is a block diagram of an AAL/ATM receiver.

FIG. 3 shows the high-level block diagram of an AAL/ATM receiver 310 and its interface 311 to the ATM Memory Management Unit (MMU) 312. The AAL/ATM receiver 310 of the above noted application entitled "Broadband ISDN Processing Method and System" filters ATM cells whose connections have been set up by the network. It also performs the required AAL protocol on a per-cell basis, and passes the user information to the MMU 312.

Upon connection setup, the MMU 312 is informed of Quality Of Service (QOS) parameters, such as bandwidth requirements, and type of traffic (reliable, or best effort) through a quality-of-service signal. Thus, the MMU 312 that monitors each connection either reassembles a packet to be sent to the host (in the case of VBR traffic), or passes the cell body to the host (when supporting CBR traffic).

ATM Memory Management

Unit Design Considerations

As physical memory pages are made smaller, the size of the page table 207 increases. As an example, if one page table supports AAL types 3/4, page size can be made as small as the cell payload which is 44 bytes. To support a packet size of 64 Kbytes, a table containing 1490 pages is needed. Each page requires a pointer to memory address locations in a physical memory space. Pointer processing requires storage and increases the amount of total physical memory needed.

If a processor is used to control a large paging scheme, a search algorithm must be implemented to handle the search and assignment of available pages. The use of a processor to carry out this routine is, in general, slow due to the number of entry comparisons that are required. A decision must be made within one ATM cell slot time (2.73 µS at STS-3c rates in a byte processing manner). A solution that minimizes the search routine processing time is to use CAMs, which implement the search algorithm in hardware, and allow simultaneous comparison of a number of entries. Thus, CAMs serve as search engines and relieve the processor of cycle-consuming operations.

It is also important to strike a compromise between the number of devices to implement the MMU and the number of connections to be handled by the MMU. An objective of the present invention is to provide a flexible and implementable architecture, which is easy to expand if more connections are needed. To obtain such an architecture, the number of CAMs or pages is reduced, as discussed above. Presently, CAMs are commercially available in sizes with up to 1K locations. To manage a physical memory space of 1 Mbyte, $2^{20}/44=23,832$ pages will be required (44 bytes is the cell payload size and the page size for ATM Adaption Layers 3 and 4). This will require 24 CAM units. However, if the pages sizes are, for instance, 1 Kbyte, then for a physical memory space of 1 Mbyte, one only needs to manage 1K pages, or a single CAM device.

Another factor to be considered is the size of the physical memory. Assuming a 64 Kbyte FIFO size, an ATM MMU with 1 Mbyte RAM would support $2^{20}/2^{16}=16$ queues or connections. However, the ATM network Virtual Circuit Identifier (VCI) space is 64K because there are sixteen bits of VCI in an ATM cell. See BELLCORE TECHNICAL ADVISORY, TA-NWT-001113 "Asynchronous Transfer Mode and ATM Adaption Layer Protocols Generic Requirement", Issue I, August 1992.

Similarly, if one includes the Virtual Path Identifier (VPI), this is increased 256 times (eight bits in an ATM cell) at the user network interface and 4096 times (twelve bits in an ATM cell) at the network-network interface. For connectionless traffic, the Message Identifier (MID) space is 1K (ten bits in the ATM adaptation layer overhead). Thus, the number of possible connections offered by the network is large, and the architecture of the present invention should be modular to accommodate a large number of connections.

Virtual FIFO

Figure 4A:
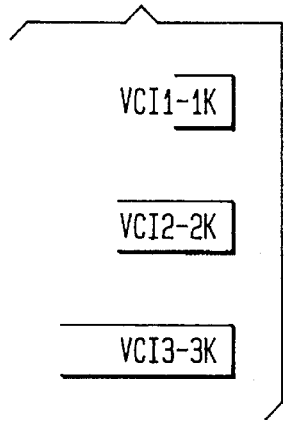
FIGS. 4a and 4b are schematic diagrams illustrating the allocation of FIFO space to connections with FIG. 4a specifically illustrating a connection using dedicated FIFOs and FIG. 4b specifically illustrating a connection using virtual FIFOs.
Figure 4B:
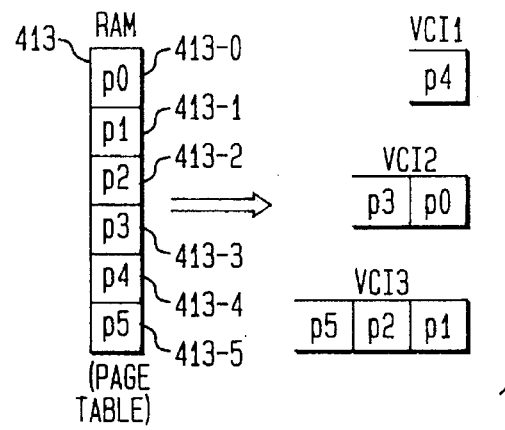

Segmentation and paging of memory results in a physical memory that can be dynamically modeled as a number of connections with dedicated, different depth FIFOs. FIG. 4a shows the case of three connections (VCI1, VCI2, and VCI3), with dedicated FIFOs of 1K, 2K and 3K, respectively. FIG. 4b shows the concept of virtual FIFO. A 6 Kbyte memory device 413 is partitioned into six 1K pages (p0 to p5) 413-0 to 413-5. Connection VCI1 is assigned a segment whose size is one page (p4) 413-4, connection VCI2 is given p0 413-0 and p3 413-3 (2K), and connection VCI3's segment is composed of p1 413-1, p2 413-2, and p5 413-5 (3K). After the partition is performed, a CAM table is used to store FIFO pointers such as read pointers, write pointers, and other relevant values associated with the virtual FIFO as it will be described later.

Virtual FIFO Functionality

Figure 5:
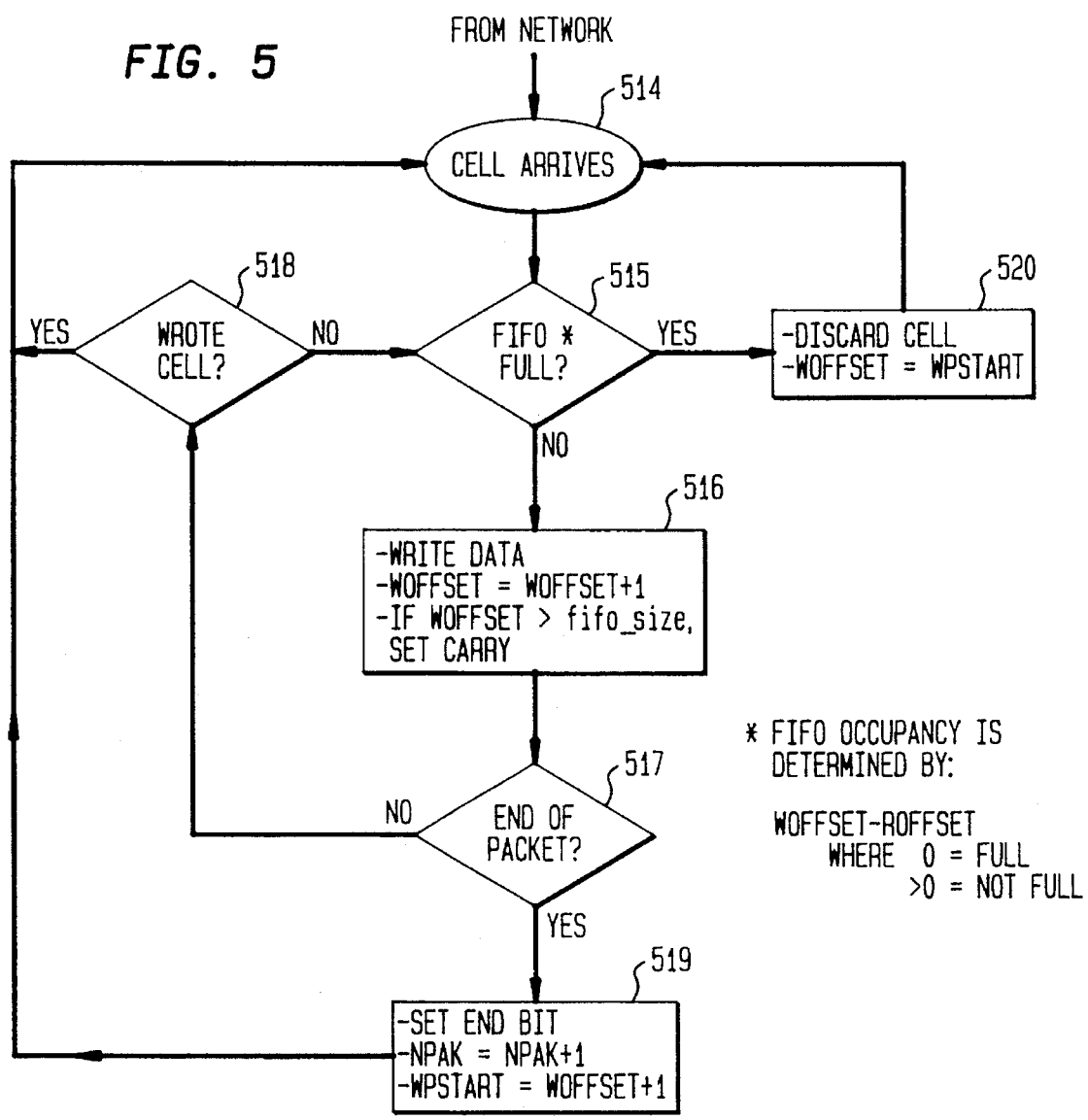
FIG. 5 is a block diagram flowchart illustrating a virtual FIFO procedure for writing a cell.

As segments are assigned to a connection, the associated page or pages must perform FIFO functionality. FIG. 5 shows the flowchart for the FIFO write procedure. When a cell arrives 514 for a given connection, the FIFO 515 is checked for occupancy. FIFO occupancy is determined by the subtraction of a WOFFSET and a ROFFSET pointer. WOFFSET (write offset) indicates the next available location to be written in the FIFO, while ROFFSET (read offset) points to the next location to be read from the FIFO. If WOFFSET-ROFFSET equals zero, the FIFO is full, and if WOFFSET-ROFFSET equals greater than zero, then the FIFO is not full.

If the FIFO is not full 516, the cell payload bytes are written into the FIFO, and WOFFSET is incremented by one (WOFFSET=WOFFSET+1) to point at the next available free FIFO entry location. If WOFFSET exceeds the FIFO size, then a carry bit (CARRY) is set and added to WOFFSET (at its most significant bit), until ROFFSET exceeds the FIFO size, at which time CARRY is reset as is well known to one of ordinary skill in this art. This is done so that one can always determine the FIFO occupancy. If the last cell of a packet (indicating the end of a packet) is not detected, and the full cell has not been written, the same procedure is performed again. If the end of the packet is not found 517 and the end of a cell is found 518 (wrote cell=yes), the next incoming cell is allowed to arrive. However, if the end of a packet 517 is found (end of packet=yes) 519, an END bit value, in RAM space, is set to one, and a NPAK value indicating the number of packets waiting in the virtual FIFO is updated. WPSTART (write packet start), indicating the location where a new packet begins in the FIFO, is updated to point at the next new packet entry position.

If the FIFO 515 is full, the incoming cell is discarded 520 and the WOFFSET is equated to WPSTART. Since the incoming cell cannot be accommodated in a FIFO, this implies that a packet will be corrupted, so that any cells belonging to that packet should be discarded. By resetting the WOFFSET value to WPSTART, entry that is part of the dropped packet in the FIFO is automatically erased because any new incoming packet which will be written at WPSTART and will override any information from the previous packet. In other words, if cells that are part of a new packet arrive, there will be FIFO space only if packets were read from the FIFO during the time between the cell dropping and the new incoming packet, or if the incoming packet size is smaller than the number of available FIFO empty locations.

Similar to the write procedure of FIG. 5, a read procedure is shown in FIG. 6a. ROFFSET points at the location of the next packet to be read when a packet is ready. As information is read, the ROFFSET value is updated (ROFFSET= ROFFSET+1). If the ROFFSET value ever exceeds the FIFO depth (ROFFSET=fifo size), the CARRY bit of the WOFFSET is reset (reset CARRY). This procedure is done until the END bit entry is detected at which time the NPAK value is decremented (NPAK=NPAK−1).

To accomplish the above read and write procedures, each connection is assigned through a virtual FIFO control table as shown in FIG. 6b. This table is implemented with a CAM device. All connections are accessed by using their respective VCI values, and updated by external control.

ATM MMU Architecture

The architecture of the present invention is shown in block diagram form in FIG. 7. The ATM MMU 712 consists of four blocks; an Embedded Controller (EC) 721, a Lookup Table (LT) 722 consisting of two Content Addressable Memories (CAM1 723, and CAM2 724), a Controller 725, and Memory Unit (MU) 726. The EC 721 provides architecture flexibility through the use of software programs which are easily changed by reprogramming. The EC 721 interprets traffic descriptors from the network and translates them into queue requirements.

The Controller 725 relieves the EC 721 of time-consuming operations, for example, the conversion of logical to physical addresses and the transfer of this information to the CAMs 723,724. The Controller 725 can be implemented using commercially available components such as FPGAs (i.e. Field Programmable Gate Arrays), which allow for fast prototyping turn-around time.

The LT 722, consisting of CAMs 723 and 724, also relieves the EC 721 of wasting CPU time. The use of CAMs 723,724 greatly simplifies the setup and updating of a page table, and avoids the use of software control search algorithms. CAMs 723 and 724 operate as search engines, and they consist of a memory space that can be accessed by associativity. Cam memory space can be partitioned into an associative area and a RAM area. CAMs also provide random access, which is useful for moving data in and out of them. One particular function is the writing to a next free CAM memory location, which relieves the EC 721 from keeping a list of free addresses. Similarly, there is a function to provide the removal of entries in a single transaction such as by associating which means matching multiple different locations which contain similar entries and removing the multiple entries. CAMs 723,724 also contain well known masking functions for the associative as well as for the RAM areas in order to give flexibility in the performance of the search algorithm.

The MU 726 consists of dual-port RAMs, or single-port RAMs with two FIFOs at the output to the host. In the case of a dual-port RAM implementation, information can be read from the input/output ports at different speeds, thus there is no need for external FIFOs. However, if single-port RAMs are used, the input/output port is shared, and the read cycle is restricted to a given time. To avoid this restriction with the read cycle, two FIFOs are placed between the RAM and the host. The single-port RAMs with dual FIFOs are for CBR and VBR traffic, respectively, to provide rate matching. Information is transferred from the single-port RAM into the FIFOs until a packet is complete for VBR traffic, or a cell payload is complete for CBR traffic. Then, the FIFOs allow the host to transfer information at its system speed which is usually independent of the network speed.

At system utilization, the EC 721 partitions the MU 726 into physical pages. Since this partitioning is software controlled, page sizes can be arbitrarily chosen. A page table is permanently entered on CAM1 723, as shown in FIG. 8a, where at each CAM1 723 location a number of bits are assigned to indicate the starting physical page address. In FIG. 8a, the following conventions are employed:

VCI—Virtual Circuit Identifier
Lp—Logical Page
PHp—Physical Page
A—Aging bit
E—Extended bit These entries are designated as PHp0 to PHpn, and are placed in the CAM RAM area 827. These entries are protected from being overwritten by the CAM masking function as is well known. Similarly, FIG. 8b shows the MU pages 828 (p0 to pn). Pages can be as small as 44 bytes and can be arbitrarily large depending on the memory space. However, the implementation trade off discussed above must be considered.

At call setup, signaling information is passed to the EC 721. If the EC 721 recognizes a request for reliable-type traffic as previously defined, it runs a short segmentation algorithm, during which it assigns a permanent number of physical pages to a given connection by correlating them with a logical page number. The permanent number is a function of the buffer requirement of the service. For example, if a service requires 3K of memory and page size is 1K, the permanent number becomes 3. This procedure effectively forms a virtual FIFO. The EC 721 then enters as many VCIs and logical page values (LpO-n) in CAM1 723 as physical pages are needed. These entries are automatically associated with the physical page (PhpO-n) addresses by taking advantage of the CAM's write-at-next-free-location function. FIG. 8a shows the VCI and logical page entries (LpO-n), on CAM1's 723 associative area 828, as VCI/Lp0 to VCI/Lpn. In FIG. 8c, the following conventions are employed:

LPPV—Logical Page Pointer Value
OFFSET—Page Offset
B—Beginning bit
NPAK—Number of Reassembled packets
MAXSIZE—Maximum Packet Size
E=Extended Bit The EC 721 must also set CAM2 724 (see FIG. 8c) to contain the VCI in the associative area 829, and the Logical Page Pointer Value (LPPV) and OFFSET in the RAM area 830. The LPPV and OFFSET are incremented by the Controller 725 as cells are written into the MU 726. The WOFFSET, ROFFSET, and WPSTART values (in FIG. 6b) for virtual FIFOs are formed as a combination of LPPV and OFFSET values as will be discussed below. For simplicity, only one LPPV and OFFSET are shown, instead of three entries. The LPPV and VCI are used as pointers to CAM1 723 to obtain a physical page (Phpx), which is then combined in the Controller 725 with the OFFSET to form the physical memory address 209, as shown in FIG. 2.

During call establishment, if a request for best-effort traffic is received, the EC 721 can do one of two things, Depending on the application to be supported, it can guarantee a minimum FIFO size, and perform the same MU 726 assignment function as above. If at any point in time, the FIFO size is exceeded, the EC 721 can grant an extra virtual FIFO to the connection or extend the virtual FIFO size, assuming that there are any free pages available, and given that the lamest packet entry does not exceed the connection maximum packet size. This effectively increases the amount of FIFO space given to a connection.

At any point in time, if more FIFO space is requested, the Controller 725 makes a request after checking that a given connection's latest packet entry has not exceeded its maximum packet size, and that lost cells have not been detected (by looking at the Beginning of Message (BOM) bit in AAL types 3/4, or end of packet bit in AAL type 5). A "B" bit (FIG. 8c), used by the Controller 725, is found in CAM2 724 to indicate that a packet beginning is expected. Cells are flushed by the Controller 725 whenever errors are found in accordance with the algorithm of FIG. 9 which is described hereinbelow. The maximum packet size is also shown in CAM2 724 as MAXSIZE which is determined by the service supported. The MAXSIZE value is entered at call setup, while the "B" bit is initially set by the EC 721 and updated by the Controller 725.

Controlling the dynamic allocation of the MU 726 requires that the EC 721 monitor that the CAM is not full. The EC 721 must also perform an aging/purging mechanism using the aging bit previously described (only for best effort traffic), where, if a connection has been idle for more than a given time, it should be disassociated from a virtual FIFO because there is no activity for that particular connection. This mechanism frees memory for other connections and improves memory usage. An extended memory "E" bit and an aging bit "A" are contained in the CAMs 723,724 (see FIGS. 8a and 8c). CAM1's 723 "E" entry indicates a best effort connection, and it is used by the Controller 725 to order the EC 721 to flush any entry related to this connection if a transmission error is found, provided that the FIFO has no complete packets waiting to be read. The Controller 725 does not engage the EC 721 until a new packet beginning is detected. At purging time, the "A" bit and "E" bits in CAM1 723 are checked, and if the entry is found to be out-of-date (according to the aging/purging mechanism), all entries for the given connection are flushed until the Controller detects a new beginning of packet and no complete packets are available.

ATM MMU Functionality

Figure 9:
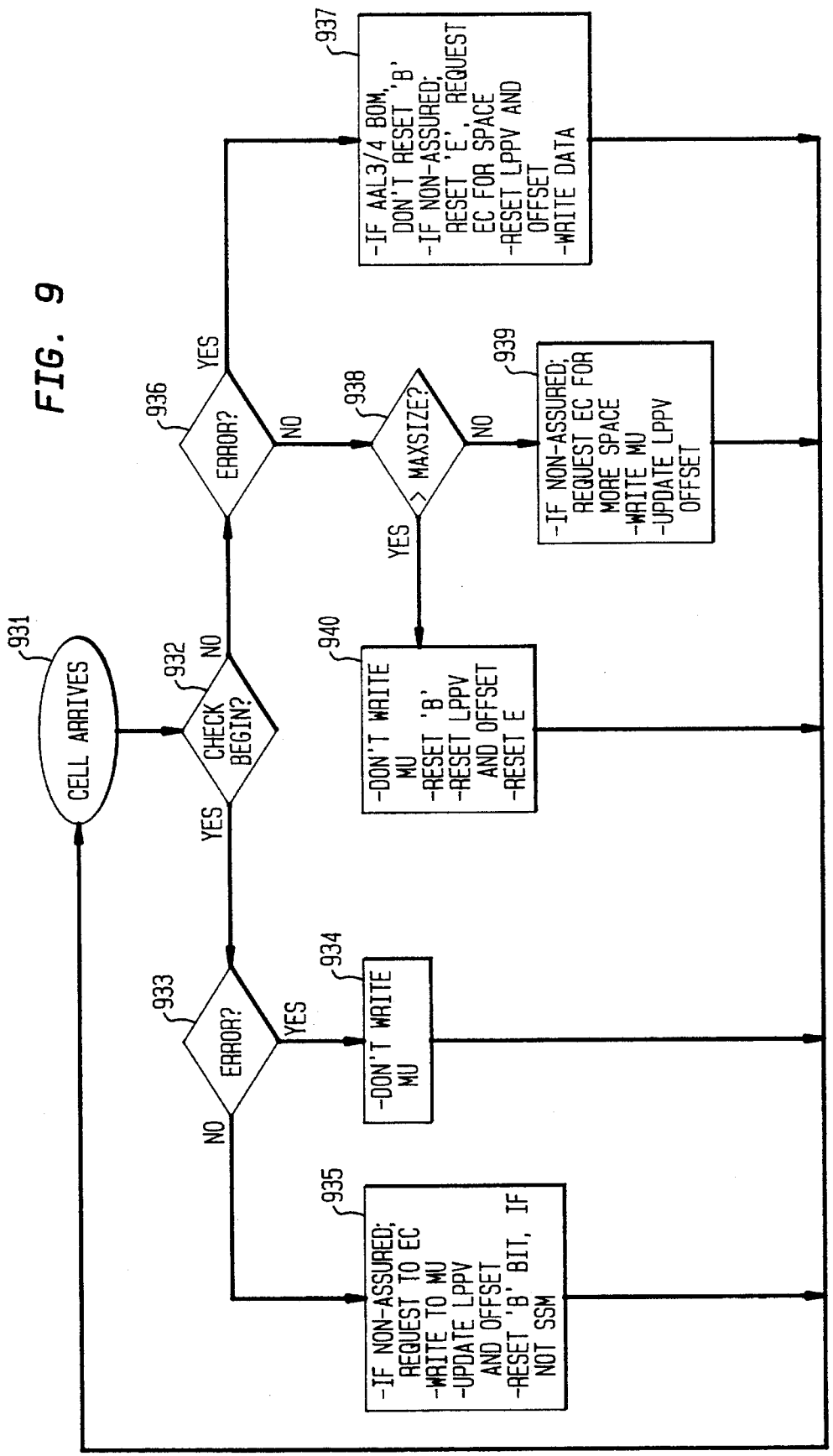
FIG. 9 is a block diagram ATM MMU flowchart for writing a cell.

Writing to the MMU. FIG. 9 shows the functionality flowchart of the ATM MMU 712 to receive ATM calls and reassemble packets in the virtual FIFOs. When a cell arrives 931, CAM2's 724 B bit is used as the expected packet status. Whenever B is set, indicating that a packet is expected, B is compared 932 to the incoming cell information. In the case of AAL3/4, the BOM field can be used. For AAL5, as long as the packet end is not detected and is not a single message, the cell can be assumed to be a packet beginning. If an error is found 933 during the comparison, no entries are written in the MU 934. Otherwise, if no error is detected and a best effort cell is received 935, the EC 721 will request a FIFO queue if no queue has been assigned to this connection, or if more FIFO space is needed and there is room available. The cell will be written, and LPPV and OFFSET will be updated. The B bit will be reset only if the incoming cell is not a single segment message (SSM).

When a packet continuation or end is received, it is checked for error 936 and if an error is detected and the connection is type AAL3/4, the B bit is unchanged 937. This is done since the cell being received indicates the beginning of a message, and the next cell should either be a continuation or end. In the case of best effort traffic, the EC 721 will request FIFO space, as discussed previously. Furthermore, LPPV and OFFSET are updated in CAM2 724, and the information is written in the MU 726. However, if no error is found in the continuation or end of a packet, the packet maximum size is checked 938. When MAXSIZE is not exceeded 939, more FIFO space is requested if best effort traffic is supported and no empty locations are available to store the cell. In addition, LPPV and OFFSET are updated and finally the cell is stored. Otherwise, if MAXSIZE is exceeded 940, the cell is not stored and the virtual FIFO is reset to expect a new packet (update LPPV, OFFSET, and B). For best effort connections, the FIFO space is deallocated (reset E), whenever no complete packets are in the virtual FIFO for the given connection.

Reading from the MMU. Different scheduling algorithms, to transfer packets from the MMU 712 to the Host, can be implemented with the help of the EC 721. For instance, the EC could use the VCI/NPAK values on CAM2 to implement a software based round-robbing mechanism. If other scheduling algorithms are required, the EC 721 can be reprogrammed. The NPAK value is updated by the EC 721 as packets are transferred from the MMU 712 to the Host. Also, if at any time the EC 721 requires external FIFO space for processing, the virtual FIFOs from the MMU 712 can be allocated to the EC 721.

Conclusions

ATM networks require hosts with a memory management scheme to reassemble data packets when cells are interleaved and also to perform congestion control at ATM transmitters. The method and system of the present invention utilize virtual FIFOs by partitioning a physical memory space to emulate FIFO queues. The method and system also utilize an algorithm that provides a virtual FIFO implementation. Furthermore, the virtual FIFO concept is used in an ATM Memory Management Unit architecture. The architecture consists of an embedded controller, RAM, CAMs, and dedicated logic.

This architecture provides flexibility and can be used to dynamically allocate FIFO memory space to connections depending on the required quality of service (QOS). The ATM MMU is shown as residing in the network receiving terminal adaptor. It can also be placed in the ATM network, at locations where access to data packets is required. For example, it could be placed at connectionless service modules in the central office, or in ATM switches where cell buffering queue management is required or at user-network interface equipment as part of a traffic shaper. The architecture is flexible, modular, and can be implemented using either off-the-shelf components or VLSI techniques if a large number of connections are to be supported.

While the best mode for carrying out the invention has been described in detail, those familiar with the art to which this invention relates will recognize various alternative designs and embodiments for practicing the invention as defined by the following claims.

What is claimed is:

1. A method for operating a high speed Asynchronous Transfer Mode (ATM) network over which data is transmitted, the high speed ATM network transporting different types of services and on different virtual channels to a network destination, the method comprising the steps of:

partitioning a memory into physical pages upon system initialization;

receiving a quality of service signal upon call setup identifying a type of service as one of best-effort traffic requiring a variable amount of memory space and reliable-type traffic requiring pre-allocated fixed amounts of memory space;

wherein if the quality of service signal identifies the type of service as reliable-type traffic, running a segmentation algorithm which assigns a permanent number of physical pages to a given connection to create a virtual first-in, first-out (FIFO) queue;

wherein if the quality of service signal identifies the type of service as best-effort type traffic, running a segmentation algorithm which assigns a permanent number of physical pages to a given connection to create a virtual first-in, first-out (FIFO) queue and if the memory space required for the best-effort type traffic exceeds the number of physical pages assigned, granting extra pages to the service to increase the size of the virtual FIFO queue if extra pages are available;

storing data into a virtual FIFO queue created for the type of service identified in the quality of service signal received at call set-up;

reassembling the data that is in the virtual FIFO queue created for the type of service identified in the quality of service signal received at call set-up; and transferring the reassembled data to the network destination.

* * * * *